US008762832B2

(12) United States Patent
Schorr

(10) Patent No.: US 8,762,832 B2
(45) Date of Patent: Jun. 24, 2014

(54) CONSTRAINT AND RULE-BASED PAGE LAYOUT

(75) Inventor: Janet L. Schorr, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 308 days.

(21) Appl. No.: 13/036,377

(22) Filed: Feb. 28, 2011

(65) Prior Publication Data

US 2011/0154190 A1   Jun. 23, 2011

Related U.S. Application Data

(62) Division of application No. 11/801,192, filed on May 9, 2007, now Pat. No. 7,949,948.

(51) Int. Cl.
G06F 17/00 (2006.01)

(52) U.S. Cl.
USPC ............ 715/243; 715/246; 715/251; 715/815

(58) Field of Classification Search
None
See application file for complete search history.

(56) References Cited

U.S. PATENT DOCUMENTS

| | | | |
|---|---|---|---|
| 5,426,729 A | 6/1995 | Parker | |
| 5,669,006 A | 9/1997 | Joskowicz et al. | |
| 5,895,477 A | 4/1999 | Orr et al. | |
| 5,956,737 A | 9/1999 | King et al. | |
| 6,026,417 A | 2/2000 | Ross et al. | |
| 6,081,816 A * | 6/2000 | Agrawal | 715/210 |
| 6,144,974 A | 11/2000 | Gartland | |
| 6,667,750 B1 * | 12/2003 | Halstead et al. | 715/788 |
| 7,107,525 B2 | 9/2006 | Purvis | |
| 7,133,050 B2 * | 11/2006 | Schowtka | 345/620 |
| 7,337,392 B2 * | 2/2008 | Lue | 715/236 |
| 7,512,508 B2 | 3/2009 | Rajski et al. | |
| 7,555,711 B2 | 6/2009 | Chao et al. | |
| 7,743,325 B2 * | 6/2010 | Berker et al. | 715/246 |
| 2004/0019851 A1 | 1/2004 | Purvis et al. | |
| 2004/0148571 A1 * | 7/2004 | Lue | 715/514 |
| 2004/0205472 A1 * | 10/2004 | Purvis | 715/500 |
| 2004/0243930 A1 | 12/2004 | Schowtka et al. | |

(Continued)

FOREIGN PATENT DOCUMENTS

WO   WO 2005-022400 A3   3/2005

OTHER PUBLICATIONS

Borning et al., "Constraint-Based Document Layout for the Web," Oct. 2000, Multimedia Systems, 8(3):177-189.
Jacobs et al., "Adaptive Document Layout," Aug. 2004, Communications of the ACM Archive, Interactive Immersion in 3D Graphics, 47(8):60-66.

(Continued)

*Primary Examiner* — Maikhanh Nguyen
(74) *Attorney, Agent, or Firm* — Rachel Vaughn; Jim Ross; Micky Minhas

(57) ABSTRACT

Constraints and rules are defined for one or more content objects. The constraints are utilized to lay out content objects on a canvas. Content is received for one of the content objects. The constraints and rules for the content object are utilized in an attempt to fit the content to the selected content object. If the content cannot be fit to the selected content object, the rules are utilized to modify the constraints for the other content objects and the layout for the canvas is regenerated. If the available content cannot be fit to the content objects on a page without overflowing, one or more additional pages are added to the canvas. Once the additional pages have been added, the content objects are laid out and content is fitted to the content objects across all of the pages.

14 Claims, 6 Drawing Sheets

(56) References Cited

U.S. PATENT DOCUMENTS

| | | | |
|---|---|---|---|
| 2005/0007382 A1* | 1/2005 | Schowtka | 345/619 |
| 2005/0094206 A1 | 5/2005 | Tonisson | |
| 2005/0172221 A1 | 8/2005 | Kobashi et al. | |
| 2006/0066631 A1 | 3/2006 | Schorr et al. | |
| 2006/0070005 A1 | 3/2006 | Gilbert et al. | |
| 2006/0155700 A1 | 7/2006 | Dejean et al. | |
| 2006/0209093 A1* | 9/2006 | Berker et al. | 345/660 |
| 2006/0212801 A1 | 9/2006 | Berker et al. | |
| 2006/0294460 A1 | 12/2006 | Chao et al. | |

OTHER PUBLICATIONS

Holman, Ken G., "Basic Concepts of XSLFO," downloaded Mar. 14, 2007 from http://www.xml.com/pub/a/2002/03/20/xsl-fo.html?page=5, 7 pages.

Munson, Ethan V., "A New presentation language for Structures Documents," Sep. 1996, Proceedings of EP96, the International Conference on Electronic Departments, Document Manipulation and Document Disseminations, Palo Alto, CA, 15 pages.

U.S. Official Action dated Jul. 20, 2010 in U.S. Appl. No. 11/801,192.

U.S. Notice of Allowance / Allowability dated Dec. 1, 2010 in U.S. Appl. No. 11/801,192.

* cited by examiner

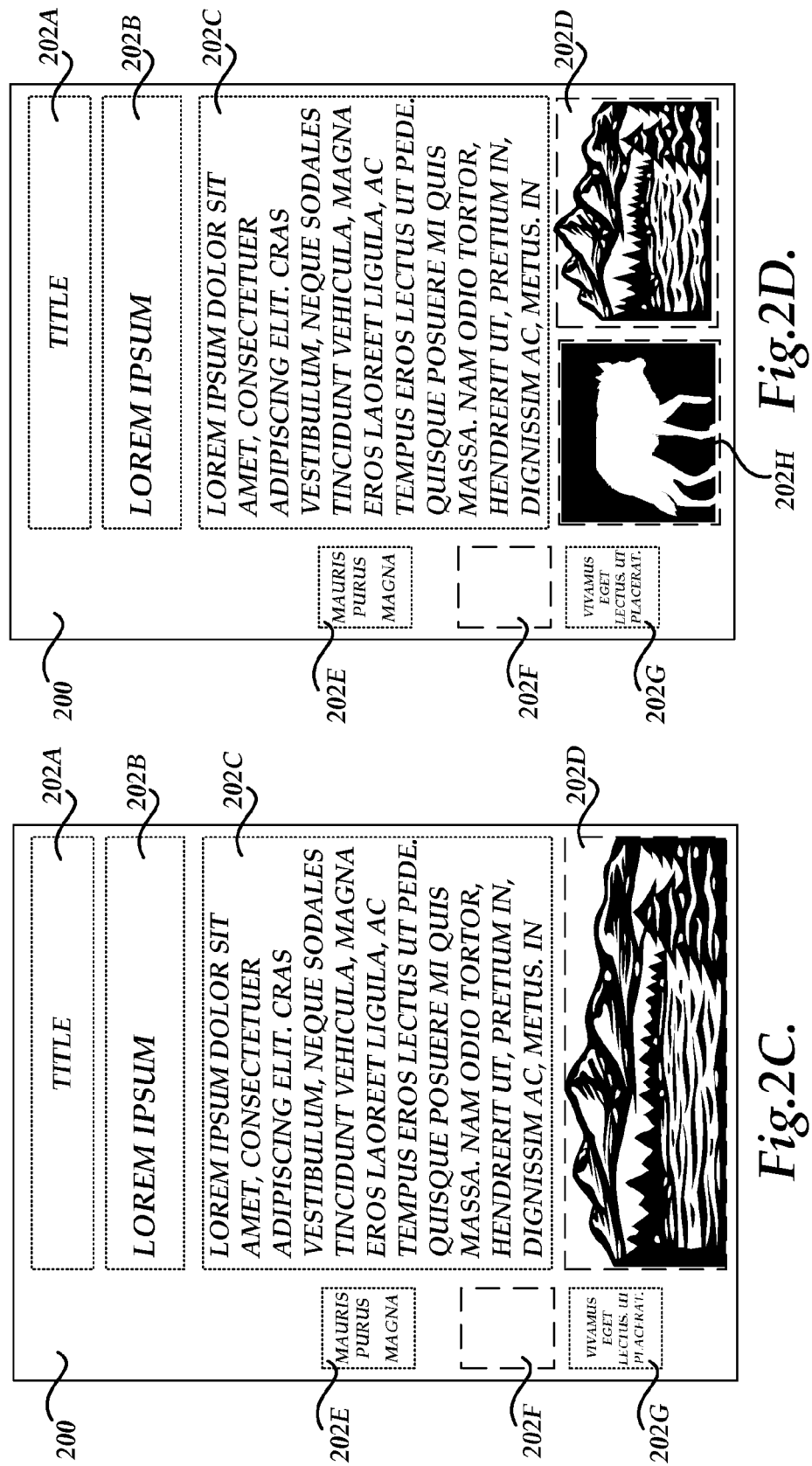

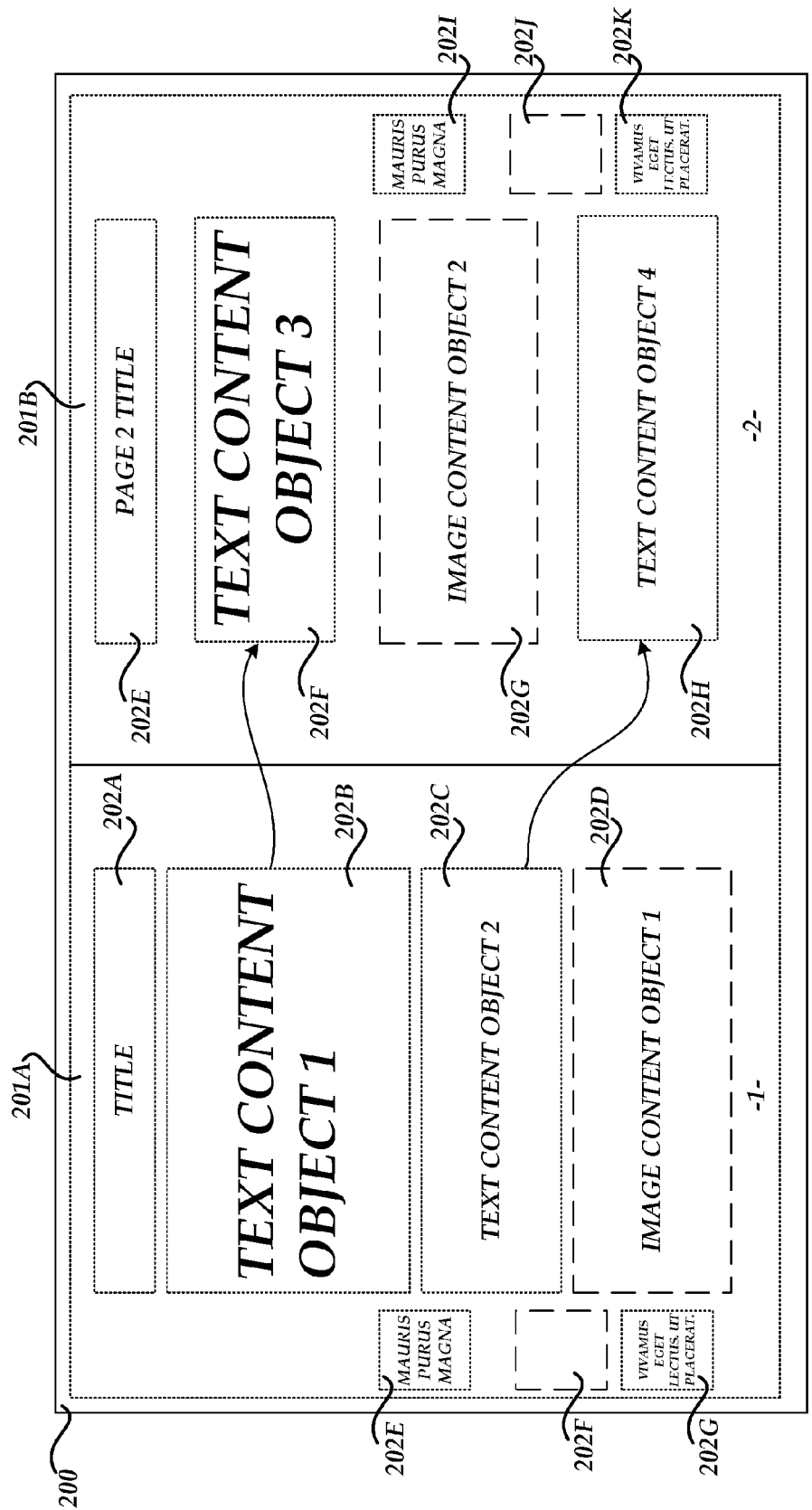

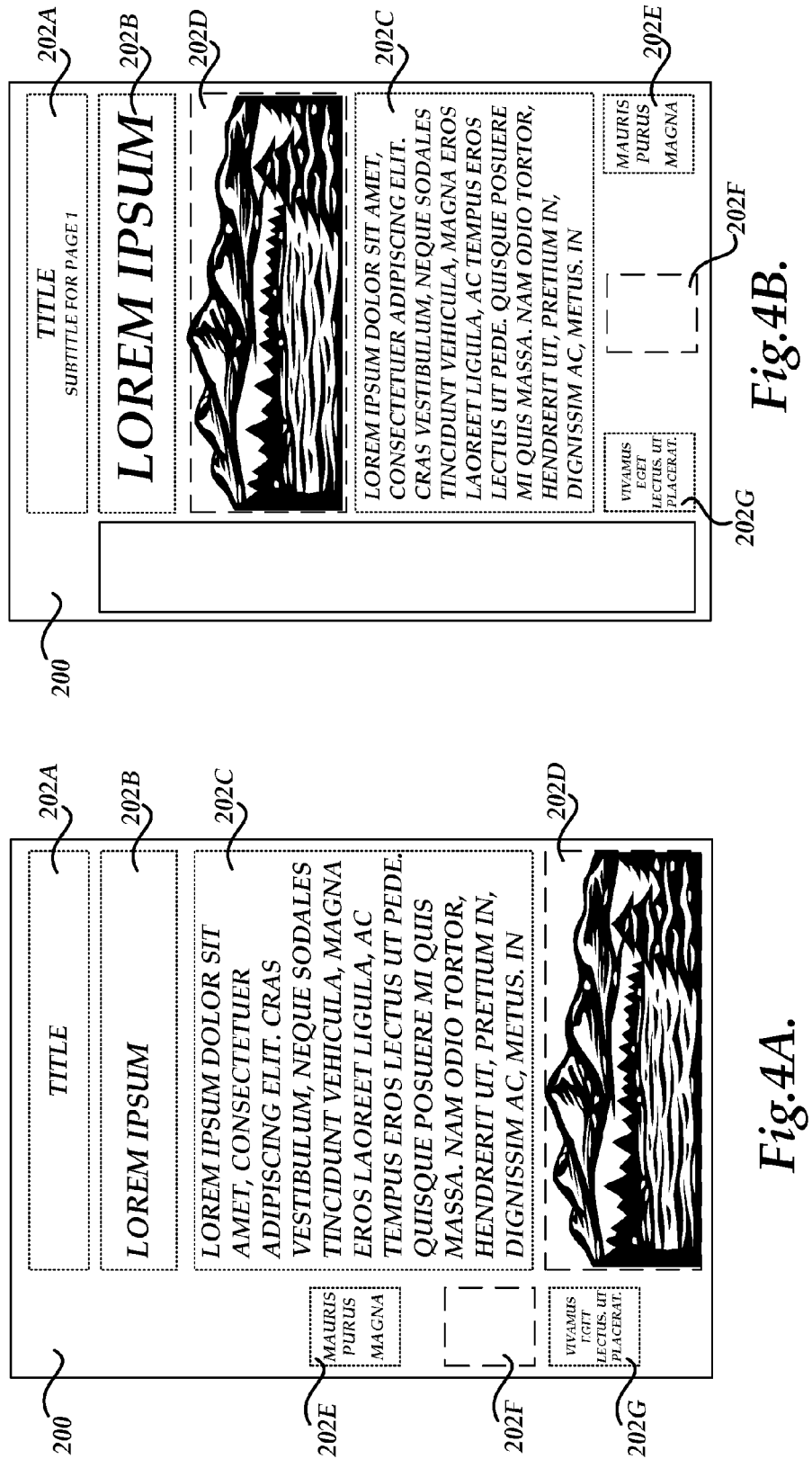

CONSTRAINT AND RULE-BASED PAGE LAYOUT

CROSS REFERENCE TO RELATED APPLICATIONS

This patent application is a division of U.S. patent application Ser. No. 11/801,192, entitled "Constrain and Rule-Based Page Layout," filed May 9, 2007, now U.S. Pat. No. 7,949,948, which is expressly incorporated herein by reference in its entirety.

BACKGROUND

Existing desktop publishing ("DTP") applications generally allow pages of a publication to be laid out using an entirely freeform approach or, alternately, lay out pages automatically using static templates. Applications using the freeform approach provide little if any design guidance. This type of application thereby allows skilled users the flexibility to create virtually any type of page layout for their publication. For instance, a DTP application using the freeform approach requires a user to design and place all of the content on each page of a publication, and to manually break content to change the flow of the content on and between pages. While these types of applications are perfect for highly skilled designers, this approach to DTP is generally unsuitable for users that do not have the creativity or design skills to create their own layout.

DTP applications that automatically lay our content using static templates typically provide significant design guidance in the form of a pre-determined page structure and design contained in the templates. Using these types of applications, a user need only insert content into placeholders defined by a template. This allows a user to easily generate a professional-looking publication by providing only the content that is utilized within a template and possibly performing some minor adjustments. These types of applications are limiting, however, because they typically force users into adapting their content to the structure and design of the provided templates. Although the ability to customize a template is often provided, template editing typically requires that a user utilize a more freeform experience and, as a result, often sacrifices the design assistance provided through the use of the templates.

It is with respect to these considerations and others that the disclosure made herein is provided.

SUMMARY

Technologies are described herein for laying out content. Through the utilization of the concepts presented herein, a DTP application, or other type of application program, can dynamically lay out content in a manner that takes the amount of content into account when generating the layout. In this manner, a multiple-page layout can be generated that requires little or no manual adjustment by a user.

According to one aspect presented herein, a DTP application program is provided that is capable of laying out content on a canvas. In order to lay out the content, the DTP application utilizes a layout definition file that defines constraints and rules for one or more content objects on the canvas. The content objects are placeholders for text, graphics, photographs, or other types of content placed on the canvas. The DTP application utilizes the specified constraints and rules to lay out the content objects on the canvas and to fit content within each of the content objects.

Constraints define the how the content objects should be laid out on the canvas. For instance, the constraints may include data defining the position and size of each content object. The constraints also define how content within each content object should be formatted. For instance, the constraints for a text content object may define the font face, font size, alignment, justification, and other formatting characteristics for text placed within the content object. The rules are utilized to modify the constraints when application of the constraints to the content within a content object results in the content overflowing the boundaries of the content object. For instance, the rules may specify that the font size may be reduced in an attempt to fit content to the boundaries of a content object.

According to implementations, the DTP application utilizes the constraints set forth in a layout definition file to lay out content objects on a canvas. The DTP application then receives content for one of the content objects. For instance, text may be received from a user for placement within a selected content object. In response to receiving the content, the DTP application utilizes the constraints and the rules for the selected content object in an attempt to fit the content to the selected content object. For instance, the constraints may be utilized in a first attempt to fit the content to the selected object. If the content cannot be fit to the content object using the constraints, the DTP application utilizes the rules to modify the constraints and a second attempt is made to fit the content to the selected object. The DTP application repeats this process until the content fits within the content object or until no further rules are available for the selected content object.

If the content cannot be fit to the selected content object using the constraints and rules for the object, the DTP application utilizes the rules defined for the other content objects to modify the constraints for the other content objects. The DTP application then regenerates a layout for the canvas. This allows the DTP application to adjust the layout of each of the content objects on the canvas in an attempt to fit the content to the selected object. The manner in which the adjustments are made is specified by the constraints and rules for each of the content objects. A similar process may also be performed to adjust the location and layout of each of the content objects on the canvas if a user adds a new content object to the canvas.

According to other aspects presented herein, the DTP application is capable of laying out content on a canvas having one or more pages. In this implementation, the constraints define how the content objects should be laid out on each page, and the rules provide instructions as to how additional pages should be added to the canvas in the event that the content cannot be fit to the content objects. The DTP application utilizes the constraints to lay out the content objects for one page of a canvas. The constraints and rules for the content objects are then utilized to fit content to the content objects on the page in the manner described above.

If the DTP application cannot fit the available content to the content objects on a page without overflowing, the DTP application adds one or more additional pages to the canvas in the manner specified by the rules. For instance, the DTP application may add one page at a time, or it may add two, four, or eight additional pages at a time when a folded newsletter or other type of publication is being created. Once the additional pages have been added, the DTP application lays out the content objects on the additional pages utilizing the constraints specified in the layout definition file. The DTP application then utilizes the constraints and rules for all of the content objects to fit the available content to objects on all of the pages. According to embodiments, this process includes fitting content to each content object individually and flowing content between content objects on located on different pages. For instance, the DTP application may flow text between content objects on different pages of the canvas. The DTP application may also move content objects between pages and add further pages to the canvas as new content is added.

According to other aspects, the DTP application provides functionality for allowing the layout of a canvas to be modified simply by applying different layout definition files to the content specified for the canvas. In this manner, a user can select the most appropriate layout for their content without performing any manual adjustments. The content laid out within each content object may be provided manually by a user or obtained from a data model. According to embodiments, the DTP application may utilize data provided through multiple data models in a layout.

It should be appreciated that although the implementations described herein are presented in the context of a DTP application, any type of program that lays out content may utilize the concepts presented herein. The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 2A-2D are screen diagrams showing aspects of a methodology utilized by a desktop publishing application presented herein in one embodiment for laying out content on a canvas utilizing constraints and rules;

FIG. 3 is a screen diagram showing aspects of one implementation provided herein for adding pages to a canvas and for laying out content on a canvas having multiple pages;

FIGS. 4A-4B are screen diagrams showing aspects of one embodiment provided herein for laying out content on a canvas utilizing two different layout definition files.

DETAILED DESCRIPTION

The following detailed description is directed to technologies for laying out content. Through the use of the embodiments presented herein, a DTP application, or other type of application program, can provide an automated layout of content on one or multiple pages of a canvas. The DTP application takes into account the amount of content to be laid out and adjusts the layout and number of pages according to constraints and rules defined for the layout. In this manner, a complex and professional layout can be generated with little or no user intervention.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
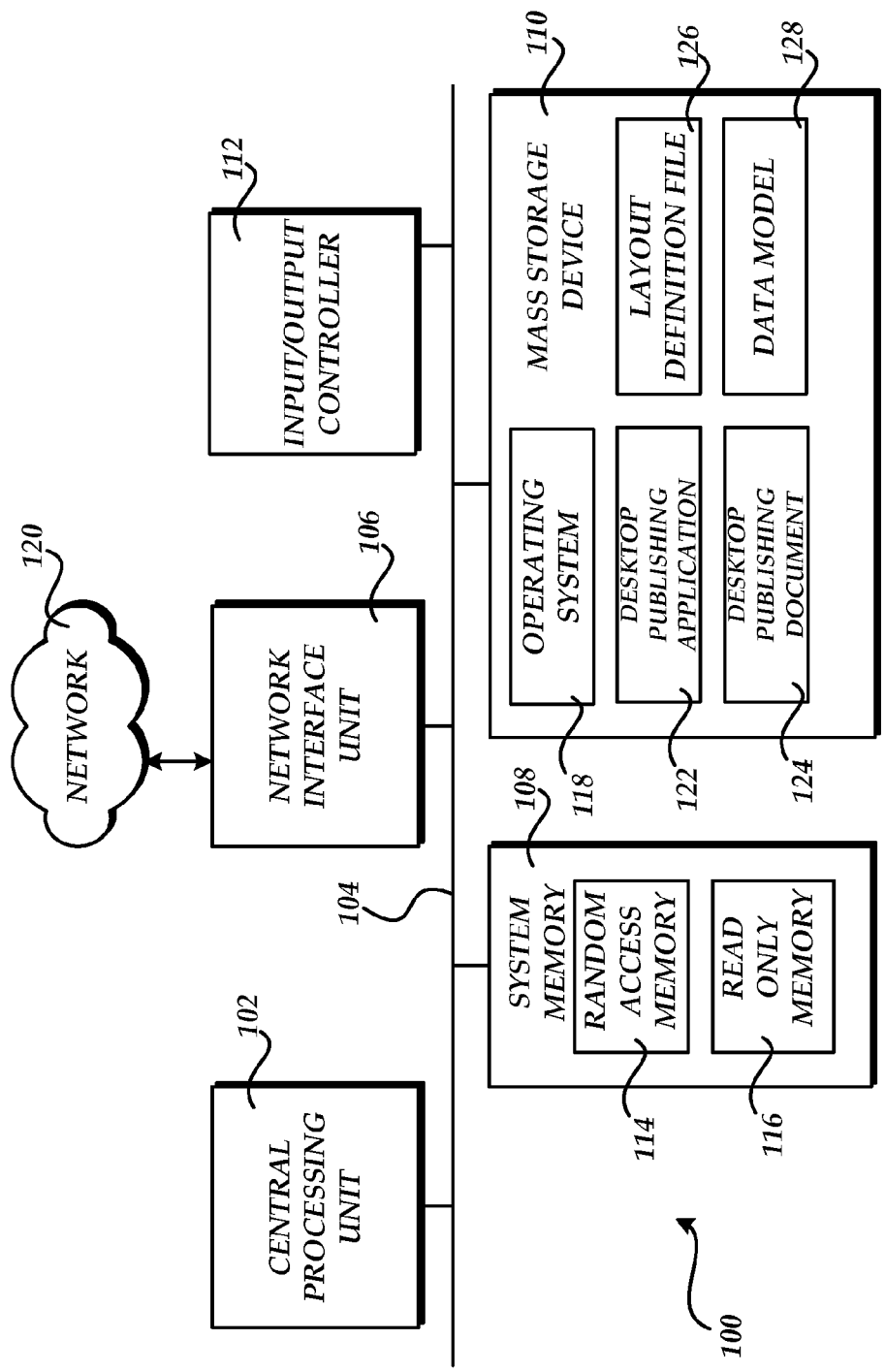
FIG. 1 is a computer architecture diagram showing an illustrative computer hardware and software architecture for a computing system capable of implementing the embodiments presented herein.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for laying out content will be described. In particular, FIG. 1 shows an illustrative computer architecture for a computer 100 capable of executing the software components described herein for laying out content. The computer architecture shown in FIG. 1 illustrates a conventional desktop, laptop computer, or server computer and may be utilized to embody any aspects of the computer program described herein.

The computer architecture shown in FIG. 1 includes a central processing unit 102 ("CPU"), a system memory 108, including a random access memory 114 ("RAM") and a read-only memory ("ROM") 116, and a system bus 104 that couples the memory to the CPU 102. A basic input/output system containing the basic routines that help to transfer information between elements within the computer 100, such as during startup, is stored in the ROM 116. The computer 100 further includes a mass storage device 110 for storing an operating system 118, application programs, and other program modules, which will be described in greater detail below.

The mass storage device 110 is connected to the CPU 102 through a mass storage controller (not shown) connected to the bus 104. The mass storage device 110 and its associated computer-readable media provide non-volatile storage for the computer 100. Although the description of computer-readable media contained herein refers to a mass storage device, such as a hard disk or CD-ROM drive, it should be appreciated by those skilled in the art that computer-readable media can be any available computer storage media that can be accessed by the computer 100.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 100.

According to various embodiments, the computer 100 may operate in a networked environment using logical connections to remote computers through a network such as the network 120. The computer 100 may connect to the network 120 through a network interface unit 106 connected to the bus 104. It should be appreciated that the network interface unit 106 may also be utilized to connect to other types of networks and remote computer systems. The computer 100 may also include an input/output controller 112 for receiving and processing input from a number of other devices, including a keyboard, mouse, or electronic stylus (not shown in FIG. 1). Similarly, an input/output controller may provide output to a display screen, a printer, or other type of output device (also not shown in FIG. 1).

As mentioned briefly above, a number of program modules and data files may be stored in the mass storage device 110 and RAM 114 of the computer 100, including an operating system 118 suitable for controlling the operation of a networked desktop, laptop, or server computer. The mass storage device 110 and RAM 114 may also store one or more program modules. In particular, the mass storage device 110 and the RAM 114 may store a DTP application 122. As will be described in greater detail below, the DTP application 122 provides the functionality described herein for laying out content on a canvas. The DTP application 122 may store the generated layout and any associated content in a DTP document 124. Additional details regarding the layout process are provided below with respect to FIGS. 2-5.

The mass storage device 110 may also store several components that are utilized by the DTP application 122 when laying out content. In particular, the mass storage device 110 may store a layout definition file 126 and a data model 128. According to various embodiments, the DTP application 122 reads the layout definition file 126 for instructions on how to lay out the content in a DTP document 124 on a canvas. The content to be laid out on the canvas may be manually provided by a user or obtained from the data model 128. Additional details regarding the layout definition file 126 and the data model 128 are provided below.

The layout definition file 126 contains instructions utilized by the DTP application 122 when laying out content. In particular, according to one implementation, the layout definition file 126 includes constraints and rules for one or more content objects in a layout. The DTP application 122 utilizes content objects to hold text, graphics, photographs, or other types of content placed on a canvas. As will be described in greater detail below, the DTP application 122 utilizes the specified constraints and rules to lay out the content objects on the canvas and to fit content within the content objects.

Constraints define the how the content objects should be laid out on the canvas by the DTP application 122. For instance, the constraints may include data defining the position and size of each content object. The constraints also define how content within each content object should be formatted. For instance, the constraints for a text content object may define the font face, font size, alignment, justification, and other formatting characteristics for text placed within the content object. It will be appreciated that constraints may include numeric values or Boolean values. Numeric constraints can specify a specific numeric value (e.g., width=1 inch). Numeric constraints may also define their value by referring to other constraints using references (e.g., height=width*0.75).

The DTP application 122 utilizes the rules to modify the constraints. In particular, the rules define how to modify one or more constraints to attempt to fit content to a content object. The rules are utilized by the DTP application 122 to modify the constraints when application of the constraints to the content within a content object results in the content overflowing the boundaries of the content object. For instance, a constraint may specify that the font size for text within a particular content object is 14 points. In turn, the rules may specify that the font size may be reduced down to 8 points in an attempt to fit text content within the content object.

According to other implementations, the layout definition file 126 may also specify a layout algorithm to be utilized by the DTP application 122 for each content object. For instance, if a content object is to contain text content, the layout definition file 126 may specify an algorithm for laying out text that is utilized by the DTP application 122 to lay out the text within the content object. Other types of layout algorithms for other types of content objects may also be specified within the layout definition file 126.

According to one implementation, the constraints and rules are specified using the extensible markup language ("XML"). XML is a standard format for communicating data. In the XML data format, a schema is utilized to provide XML data with a set of grammatical and data type rules governing the types and structure of data that may be communicated. The XML data format is well known to those in the art and, therefore, not discussed in further detail herein.

The data model 128 includes a hierarchical collection of nodes that define the content for a layout. In particular, according to one implementation, the data model 128 includes a collection of nodes that define the relationships between content objects in a layout, the content to be laid out for each content object, and various properties for each of the content objects. As will be described in greater detail below, the DTP application 122 is capable of utilizing multiple data models to generate a layout. Additional details regarding the operation of the DTP application 122 for utilizing constraints and rules to lay out content on a canvas, including the use of multiple data models, will be provided below with respect to FIGS. 2A-2D, 3, 4A-4B, and 5.

Figures 2A, 2B:
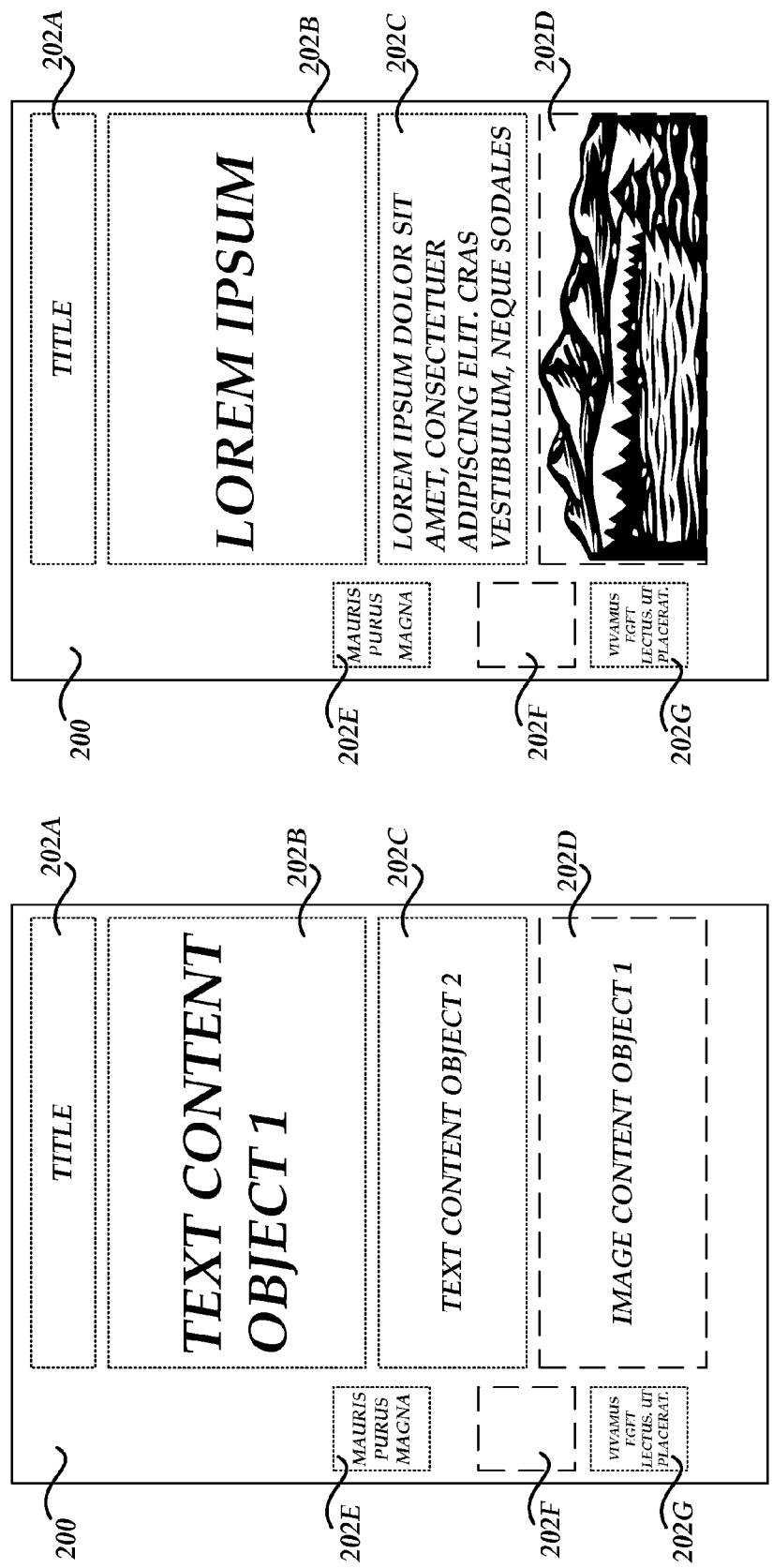

Turning now to FIG. 2A, additional details will be provided regarding one embodiment presented herein for laying out content on a canvas. In particular, FIG. 2A is a screen diagram showing the contents of an illustrative canvas 200 laid out by the DTP application 122. The canvas 200 shown in FIG. 2A comprises a single page. However, as will be discussed below with respect to FIG. 3, a canvas may be laid out by the DTP application 122 in another implementation that includes multiple pages.

The canvas 200 shown in FIG. 2A includes several content objects 202A-202G that have been laid out by the DTP application 122. For instance, on the example canvas 200 shown in FIG. 2A, the content objects 202A, 202B, 202C, 202E, and 202G are utilized to hold text. The content objects 202D and 202F are utilized to hold images. The content placed within each of the content objects 202A-202G may be placed there manually by a user. For instance, a user may select one of the content objects 202A-202G and place content therein by typing or performing a copy/paste operation. Alternatively, the content placed within each of the content objects 202A-202G may be obtained from the data model 128 and placed therein by the DTP application 122. It should be appreciated that any number of content objects 202 may be placed on a canvas 200. Additionally, although the content objects 202A-202G have been illustrated in FIG. 2A as rectangles, the content objects 202A-202G may be laid out in any shape.

As discussed briefly above, the layout definition file 126 defines one or more constraints for each of the content objects 202A-202G. The DTP application 122 utilizes the constraints to lay out the content objects 202A-202G on the canvas 200. In particular, the DTP application 122 utilizes the constraints to determine an initial location of each of the content objects 202A-202G on the canvas 200 and to determine an initial size of each of the content objects 202A-202G. The initial size and location of the content objects 202A-202G is illustrated in FIG. 2A.

FIG. 2B shows the canvas 200 discussed above with respect to FIG. 2A with sample content laid out therein. As discussed briefly above, the DTP application 122 also utilizes the constraints to lay out the content within each of the content objects 202A-202G. For instance, in the example shown in FIG. 2B, the text shown in the content object 202B ("LOREM IPSUM") is larger than the text shown in content objects 202A, 202C, 202E, and 202G. This is the result of a constraint defined for the content object 202B in the layout definition file 126 that indicates to the DTP application 122 that the text laid out therein should be a large font. As another example, the text laid out in the content object 202B is left-justified, while the text laid out in the content objects 202A, 202C, 202E, and 202G is center-justified. This, also, is a result of the constraints set forth in the layout definition file 126 that indicate the justification that should be utilized for the content objects 202A-202C, 202E, and 202G. As will be discussed in detail below, the DTP application utilizes the rules associated with each of the content objects 202A-202G to modify the constraints in an attempt to fit content to each of the content objects 202A-202G on the canvas 200.

FIG. 2C shows an illustrative layout of the canvas 200 after a user has entered additional text into the content object 202C. In this example, the DTP application 122 could not fit the entered text into the content object 202C at its original size, shown in FIGS. 2A-2B. As a result, the DTP application 122 first attempts to fit the entered text into the content object 202C by utilizing the rules associated with the content object 202C to modify the constraints associated with the content object 202C. For instance, the rules defined for the content object 202C may indicate that the font size may be reduced in an attempt to fit the entered text to the content object 202C.

In the example illustrated in FIG. 2C, application of the rules associated with the content object 202C do not allow the entered text to be fit without overflowing the content object 202C. As a result, the DTP application 122 utilizes the rules associated with the other content objects 202A-202B and 202D-202G to adjust the constraints associated with these content objects in an attempt to fit the entered text to the content object 202C. As a result, the DTP application 122 dynamically adjusts the vertical size and font of the content object 202B, the vertical location of the content object 202D, and the vertical size of the content object 202C. In this manner, the DTP application 122 is able to fit the entered text to the content object 202C while retaining the main characteristics of the initial layout shown in FIG. 2A. The DTP application 122 performs this process each time content in the content objects 202A-202G changes.

FIG. 2D shows an illustrative layout of the canvas 200 after a user has added an additional content object 202H that includes an image to the canvas 200 as illustrated in FIG. 2C. In this example, the DTP application 122 utilized the rules associated with each of the content objects 202A-202G to determine how the new content object 202H should be added to the canvas 200. In particular, the DTP application 122 utilized the rules associated with the content object 202D to reduce the horizontal size of the content object 202D in order to make room on the canvas 200 for the content object 202H. It should be appreciated that the DTP application 122 is operative to place additional content objects 202 on the canvas 200 in a similar manner.

Referring now to FIG. 3, an embodiment will be described wherein the DTP application 122 lays out content on a canvas 200 that has multiple pages 201A-201B. In this embodiment, the layout definition file 126 includes constraints and rules indicating how additional pages should be added to a canvas. For instance, the canvas 200 may be initially created with one page 201A. When content can no longer be fitted to the content objects 202A-202G on the page 201A without overflowing, the DTP application 122 utilizes the rules to determine how one or more additional pages should be added. In the example shown in FIG. 3, one additional page 201B has been added to the canvas 200.

According to one implementation, rules may be created that allow the DTP application 122 to add new pages to a canvas in a manner that is dependent upon the type of publication being created. For instance, if a single page flyer is being created, it may be undesirable for new pages to be added. In this case, a rule would be provided indicating that new pages should not be added to the canvas 200. If a folding newsletter is being created, a rule may be provided that specifies that the canvas should begin with two pages and that additional pages should be added in multiples of two. In this manner, as content begins to overflow the content objects, two pages will be added, then four pages, and so on. As new pages are added, the DTP application 122 resets the constraints for each of the content objects on all of the pages and lays out the content. In this manner, content is laid out across all of the pages on the canvas.

According to implementations, the layout definition file 126 may also include separate constraints and rules defining the constraint objects on pages that are added to the canvas 200. In this manner, each subsequent page may have the same or a different layout as the first page. For instance, in the example shown in FIG. 3, the page 201A has the same layout as the canvas described above with reference to FIG. 2A. The page 201B, however, has a different set of content objects 202E-202K and a different layout. The layout for the page 201B is defined by data stored in the layout definition file 126.

According to other aspects, rules may be set forth in the layout definition file 126 that allow content objects on different pages to be linked. When the DTP application 122 encounters linked content objects while laying out a canvas, the DTP application 122 will flow content between the linked content objects as necessary. For instance, in the example shown in FIG. 3, the content objects 202B and 202F have been linked. The content objects 202A-202H have also been linked. Through this association, the DTP application 122 understands that content may flow between the linked content objects.

When text is added to one of the content objects 202B, 202C, 202F, and 202H, the DTP application 122 will flow the text between the associated content objects. It should be appreciated that this functionality allows the DTP application 122 to adjust the sizing and position of text not only between a single content object, but also between content objects on different pages of a canvas. In this manner, as more content is added to a page of a canvas, a new page may be added including a new content object, and content may be flowed from the first page to the new content object on the newly added page.

Turning now to FIGS. 4A-4B, aspects of one embodiment provided herein capable of laying out content on a canvas utilizing two different layout definition files will be described. In particular, FIG. 4A shows a canvas 200 including the content objects 202A-202G that have been laid out by the DTP application 122 utilizing instructions in a layout definition file 126. In this implementation, a user of the DTP application 122 is provided the ability to select a new layout defined by a second layout definition file 126. Because the DTP application 122 lays out the content dynamically based upon the amount of content and the rules and constraints contained in the appropriate layout definition file 126, the DTP application 122 can utilize another layout definition file to regenerate a new layout using the same content.

In response to receiving the selection of a new layout definition file from a user, the DTP application 122 regenerates the layout of the canvas 200 utilizing the constraints and rules contained in the new layout definition file. For instance, in the example shown in FIG. 4B, the same content shown in the layout presented in FIG. 4B has been laid out using a new layout definition file. Through the use of the new layout file, an entirely different arrangement of content has been presented that has been laid out in the content objects 202A-202G in a manner that is appropriate for the amount of content present. It should be appreciated that the DTP application 122 may provide any number of layout definition files 126 and allow a user to switch between them freely.

Figure 5:
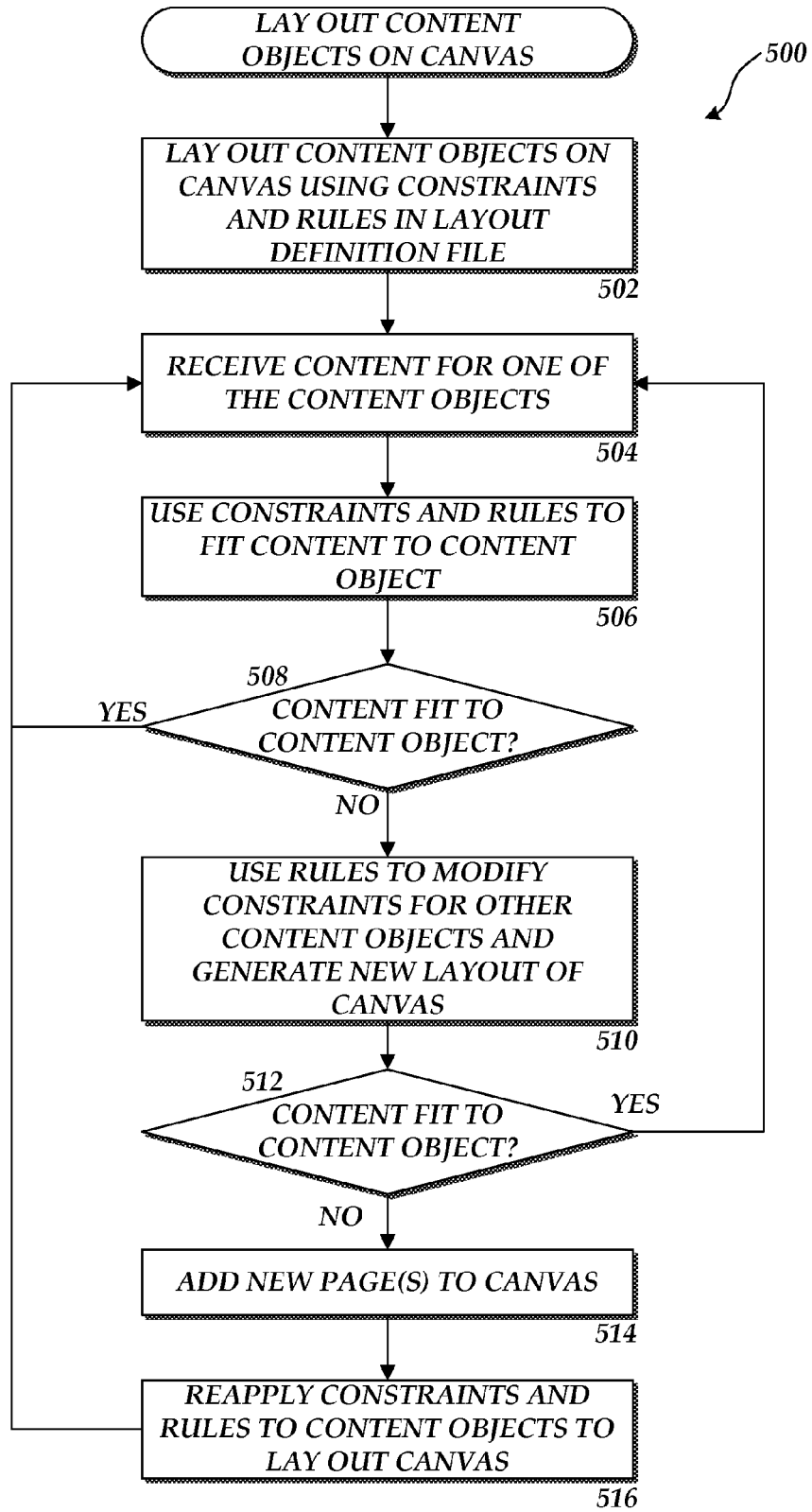
FIG. 5 is a flow diagram showing an illustrative process provided in one implementation described herein for laying out content on a canvas using constraints and rules.

Turning now to FIG. 5, additional details will be provided regarding the embodiments presented herein for laying out content utilizing constraints and rules. In particular, FIG. 5 is a flow diagram showing a routine 500 that shows aspects of an illustrative process performed by the DTP application 122 for laying out content. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 500 begins at operation 502, where the DTP application 122 lays out the content objects 202 on the canvas 200 using the constraints and rules stored in the layout definition file 126. The routine 500 then continues to operation 504, where the DTP application 122 receives content for one of the content objects 202 on the canvas 200. As mentioned above, this content may be stored in a data model 128 or manually provided by a user.

In response to receiving content for one of the content objects 202, the routine 500 continues to operation 506, where the DTP application utilizes the constraints and rules for the content object in an attempt to fit the content to the content object. According to embodiments, the DTP application 122 may utilize a modified binary search to iterate through the rules for each content object to locate the most appropriate fit. Additional details regarding such a search can be found in U.S. patent application Ser. No. 11/081,324 (Pub No. US2006/0212801), filed on Mar. 15, 2005, and entitled "Method and Computer-Readable Medium for Fitting Text To Shapes Within a Graphic," which is expressly incorporated herein by reference in its entirety.

From operation 506, the routine 500 continues to operation 508, where the DTP application 122 determines whether the content could be fit to the content object 202 utilizing the constraints and rules associated with the content object 202. If the content could be fit to the content object 202 utilizing the associated constraints and rules, there is no need to modify the other content objects on the canvas. Accordingly, in this case the routine 500 proceeds from operation 508 to operation 504, described above.

In the event that the content cannot be fit to the content object, it is necessary to adjust the other content objects on the canvas 200. Accordingly, in this case, the routine 500 proceeds from operation 508 to operation 510, where the DTP application 122 utilizes the rules associated with the other content objects on the canvas in an attempt to lay out all of the content in all of the content objects on the canvas. The modified binary search algorithm may be utilized by the DTP application 122 in its attempt to locate a suitable layout.

From operation 510, the routine 500 proceeds to operation 512, where the DTP application 122 determines whether a suitable layout was located that fit the content to each of the content objects. If so, there is no need to make further adjustments and the routine 500 returns to operation 504, described above. If not, the routine 500 continues to operation 514, where one or more additional pages are added to the canvas. As mentioned above, the layout definition file 126 may include rules indicating how and when additional pages are added to a canvas. Depending on the type of publication being laid out, pages may not be added, new pages may be added one at a time, or multiple pages may be added to the canvas at a time.

Once the new pages have been added, the routine 500 continues from operation 514 to operation 516. At operation 516, content objects are laid out on the newly added pages according to the constraints set forth in the layout definition file 126. The DTP application 122 then reapplies the constraints and rules to lay out the content across all of the pages of the canvas. As discussed above, this may include flowing text between content objects located on different pages of the canvas. Once the new layout has been generated, the routine 500 returns to operation 504, described above, where additional content may be added to the layout and processed by the DTP application 122. It should be appreciated that further pages may be added to the canvas and laid out by the DTP application program 122 in a similar manner.

Based on the foregoing, it should be appreciated that technologies for laying out content utilizing constraints and rules are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for laying out one or more content objects on a canvas comprising one or more pages, the method comprising:

defining, by a computer executing a desktop publishing application, one or more constraints and one or more rules for each of the content objects;

using, by the computer, the constraints to lay out the content objects on a first page of the canvas;

using, by the computer, the constraints and the rules to attempt to fit content to the content objects on the first page;

detecting, by the computer, that the content could not be fit to one or more of the content objects on the first page; and in response to detecting that the content could not be fit to one or more of the content objects on the first page, adding, by the computer, one or more additional pages to the canvas, the one or more additional pages having one or more additional content objects laid out thereupon, and using, by the computer, the constraints and rules to fit the content to the content objects on the first page and the one or more additional pages, wherein a content object on the first page is associated with a content object on one of the additional pages, and wherein fitting the content to the content objects on the first page and the one or more additional pages comprises flowing content between the associated content objects, and wherein using the constraints and the rules to fit the content to the content objects on the first page and the one or more additional pages comprises moving a content object from the first page to one of the one or more additional pages.

2. The computer-implemented method of claim 1, further comprising:

detecting that the content could not be fit to the content objects on the first page and the one or more additional pages; and in response to detecting that the content could not be fit to the content objects on the first page and the one or more additional pages, adding further pages to the canvas, laying out one or more additional content objects on the further pages, and using the constraints and the rules to fit the content to the content objects on the first page, the one or more additional pages, and the further pages.

3. The computer-implemented method of claim 1, wherein the constraints comprise one or more values defining how the content objects should be laid out on pages of the canvas.

4. The computer-implemented method of claim 1, wherein the rules comprise instructions for adding the one or more additional pages to the canvas.

5. The computer-implemented method of claim 1, wherein using the constraints and the rules to fit the content to the content objects on the first page and the one or more additional pages comprises flowing content between a content object on the first page and a content object on the one or more additional pages.

6. An optical disk, a magnetic storage device, or a solid state storage device having computer-executable instructions stored thereupon which, when executed by a computer, will cause the computer to:

define constraints and rules for content objects on a canvas;

use the constraints to lay out the content objects on a first page of the canvas;

use the constraints and rules to attempt to fit content to the content objects on the first page of the canvas;

detect that the content cannot be fit to a content object on the first page of the canvas; and in response to detecting that the content cannot be fit to a content object on the first page of the canvas, add a second page to the canvas, the second page having an additional content object laid out thereupon, and use the constraints and the rules to fit the content to the content objects on the first and second pages of the canvas, wherein a content object on the first page of the canvas is associated with a content object on the second page of the canvas, and wherein fitting the content to the content objects on the first and second pages of the canvas comprises flowing content between the associated content objects, and wherein using the constraints and the rules to fit the content to the content objects on the first page and the second page comprises moving a content object from the first page to the second page.

7. The optical disk, the magnetic storage device, or the solid state storage device of claim 6 having further computer-readable instructions stored thereupon which, when executed by a computer, cause the computer to:

detect that the content could not be fit to the content objects on the first page and the second page; and in response to detecting that the content could not be fit to the content objects on the first page and the second page, add further pages to the canvas, lay out one or more additional content objects on the further pages, and use the constraints and the rules to fit the content to the content objects on the first page, the second page, and the added further pages.

8. The optical disk, the magnetic storage device, or the solid state storage device of claim 6, wherein the constraints comprise one or more values defining how the content objects should be laid out on pages of the canvas.

9. The optical disk, the magnetic storage device, or the solid state storage device of claim 6, wherein the rules comprise instructions for adding the second page to the canvas.

10. The optical disk, the magnetic storage device, or the solid state storage device of claim 6, wherein using the constraints and rules to fit the content to the content objects on the first page and the second page comprises flowing content between a content object on the first page and a content object on the second page.

11. An optical disk, a magnetic storage device, or a solid state storage device having computer-executable instructions stored thereupon which, when executed by a computer, will cause the computer to:

store constraints for content objects on a canvas having one or more pages, the constraints comprising one or more values defining how the content objects should be laid out on the pages of the canvas;

store rules for content objects on the canvas, the rules comprising instructions defining how additional pages should be added to the canvas;

use the constraints to lay out the content objects on a first page of the canvas;

use the constraints to attempt to fit content to the content objects on the first page of the canvas;

detect that the content cannot be fit to a content object on the first page of the canvas; and in response to detecting that the content cannot be fit to a content object on the first page of the canvas, add a second page to the canvas using the rules, the second page having an additional content object laid out thereupon using the constraints, and use the constraints and the rules to fit the content to the content objects on the first page of the canvas and the second page of the canvas, wherein a content object on the first page of the canvas is associated with a content object on the second page of the canvas, and wherein fitting the content to the content objects on the first page of the canvas and the second page of the canvas comprises flowing content between the associated content objects, and wherein using the constraints and rules to fit the content to the content objects on the first page and the second page comprises moving a content object from the first page to the second page.

12. The optical disk, the magnetic storage device, or the solid state storage device of claim 11 having further computer-readable instructions stored thereupon which, when executed by a computer, cause the computer to:

detect that the content could not be fit to the content objects on the first page and the second page; and in response to detecting that the content could not be fit to the content objects on the first page and the second page, add further pages to the canvas, lay out one or more additional content objects on the further pages, and use the constraints and rules to fit the content to the content objects on the first page, the second page, and the added further pages.

13. The optical disk, the magnetic storage device, or the solid state storage device of claim 11, wherein using the constraints and rules to fit the content to the content objects on the first page and the second page further comprises flowing content between a content object on the first page and a content object on the second page.

14. The optical disk, the magnetic storage device, or the solid state storage device of claim 11, wherein the constraints are further used to determine an initial location and an initial size for the content objects.

* * * * *